US009014109B2

(12) United States Patent
Gaur et al.

(10) Patent No.: US 9,014,109 B2
(45) Date of Patent: Apr. 21, 2015

(54) METHOD AND APPARATUS FOR BIT-LEVEL PDSCH MUTING AND/OR RECEIVER PUNCTURING IN LTE-ADVANCED HETEROGENEOUS NETWORKS

(75) Inventors: Sudhanshu Gaur, Santa Clara, CA (US); Long Gao, Santa Clara, CA (US); Joydeep Acharya, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 330 days.

(21) Appl. No.: 13/488,543

(22) Filed: Jun. 5, 2012

(65) Prior Publication Data
US 2013/0322350 A1    Dec. 5, 2013

(51) Int. Cl.
*H04W 72/04* (2009.01)
*H04L 1/00* (2006.01)
*H04W 72/12* (2009.01)

(52) U.S. Cl.
CPC .............. *H04L 1/0013* (2013.01); *H04L 1/005* (2013.01); *H04L 1/0066* (2013.01); *H04L 1/0069* (2013.01); *H04W 72/1231* (2013.01)

(58) Field of Classification Search
CPC ...... H04L 1/0069; H04L 1/005; H04L 1/0067
USPC ................ 370/252, 329, 311, 328; 455/426.1
See application file for complete search history.

(56) References Cited

U.S. PATENT DOCUMENTS

| 8,042,028 | B2* | 10/2011 | Lin | 714/790 |
| 2009/0196261 | A1* | 8/2009 | Sambhwani et al. | 370/335 |
| 2010/0009705 | A1* | 1/2010 | Budianu et al. | 455/501 |
| 2010/0029262 | A1* | 2/2010 | Wang et al. | 455/423 |
| 2011/0081933 | A1* | 4/2011 | Suh et al. | 455/509 |
| 2011/0105144 | A1* | 5/2011 | Siomina et al. | 455/456.1 |
| 2011/0134982 | A1* | 6/2011 | Reinhardt | 375/224 |
| 2011/0268019 | A1* | 11/2011 | Tang et al. | 370/328 |
| 2011/0275394 | A1* | 11/2011 | Song et al. | 455/509 |
| 2011/0280185 | A1* | 11/2011 | Wu et al. | 370/328 |
| 2011/0305179 | A1* | 12/2011 | Wang et al. | 370/311 |
| 2012/0087261 | A1* | 4/2012 | Yoo et al. | 370/252 |

(Continued)

FOREIGN PATENT DOCUMENTS

WO    2012/002855 A1    1/2012

OTHER PUBLICATIONS

European Search Report received in European Application No. 13170525 dated Sep. 4, 2013.

*Primary Examiner* — Asad Nawaz
*Assistant Examiner* — Parth Patel
(74) *Attorney, Agent, or Firm* — Mattingly & Malur, PC

(57) ABSTRACT

A base station (BS) comprises: an interface to receive radio resource management (RRM) measurement from user equipment on received reference signal (RS) strength for each BS of one or more other BSs in a surrounding area of the user equipment; an X2 interface to receive transmission information of almost blank subframes and corresponding cell-specific reference signal (CRS) resource element (RE) locations from the one or more other BSs; and a controller to manage bit-level PDSCH (Physical Downlink Shared Channel) muting information, which includes identifying PDSCH resource elements (REs) that suffer the most from CRS interference arising from other BSs and that are to be subjected to bit-level muting, and allocating to the identified REs a number of bits less than the number of bits allocated to normal REs, and to transfer data with the two levels of bit allocations to various PDSCH REs to the user equipment.

19 Claims, 8 Drawing Sheets

(56) References Cited

U.S. PATENT DOCUMENTS

| | | |
|---|---|---|
| 2012/0122440 A1 | 5/2012 | Krishnamurthy et al. |
| 2012/0122472 A1* | 5/2012 | Krishnamurthy et al. . 455/456.1 |
| 2012/0134275 A1* | 5/2012 | Choi et al. .................... 370/241 |
| 2012/0147793 A1* | 6/2012 | Chen et al. .................... 370/280 |
| 2013/0017793 A1* | 1/2013 | Henttonen et al. ............ 455/63.1 |
| 2013/0044685 A1* | 2/2013 | Fong et al. .................... 370/328 |
| 2013/0194931 A1* | 8/2013 | Lee et al. ....................... 370/241 |
| 2013/0196675 A1* | 8/2013 | Xiao et al. .................. 455/452.1 |
| 2014/0031031 A1* | 1/2014 | Gauvreau et al. .......... 455/426.1 |
| 2014/0050191 A1* | 2/2014 | Kim et al. ...................... 370/329 |

* cited by examiner

| RE Muting Pattern Index | Muted REs (denoted by the coordinates in a PRB grid) | bitmap | status |
|---|---|---|---|
| 0 | (5,1), (8,1), (12,1), (5,4), (8,4), (12,4)... | 0011 | Active |
| 1 | (5,2), (8,2), (12,2), (5,5), (8,5), (12,5)... | 0101 | Idle |
| 2 | (5,3), (8,3), (12,3), (5,6), (8,6), (12,6)... | 0100 | Idle |
| ⋮ | ⋮ | ⋮ | ⋮ |
FIG. 9
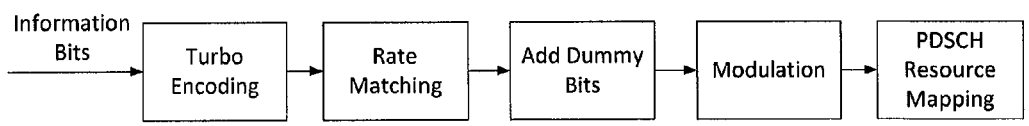
FIG. 10
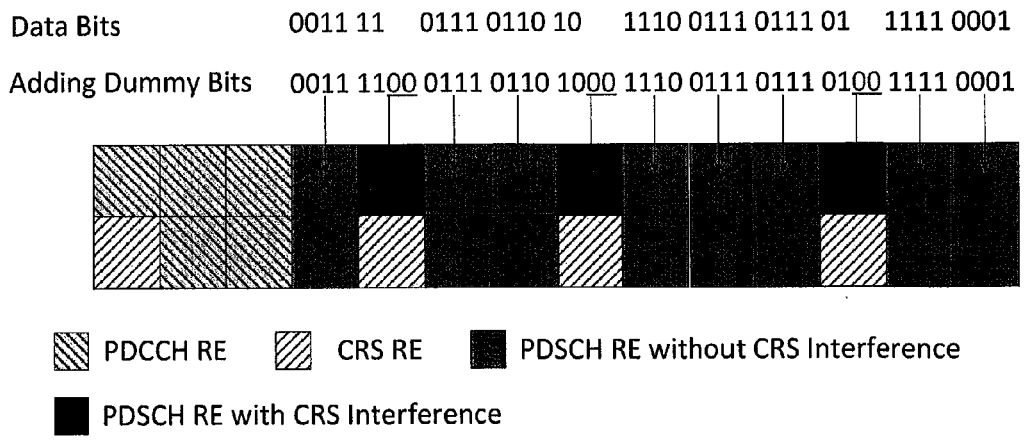
FIG. 11

L5L6L7L8  L13L14L15L16  L21L22L23L24  L29L30L31L32  L37L38L39L40

L1L2L3L4  L9L10L11L12  L17L18L19L20  L25L26L27L28  L33L34L35L36  L41L42L43L44

- PDCCH RE
- CRS RE
- PDSCH RE without CRS Interference
- PDSCH RE with CRS Interference Discarded Bit LLRs after corresponding to dummy bits: L7,L8,L19,L20,L35,L36

Bit LLRs after dropping dummy bits:

L1L2L3L4L5L6 L9L10L11L12L13L14L15L16 L17L18L21L22L23L24L25L26L27L28 L29L30L31L32L33L34 L37L38L39L40L41L42L43L44

Punctured bit LLRs: L7,L8,L18,L19,L20,L36
Bit LLRs after discarding punctured bits:
L1L2L3L4L5L6L9L10L11L12L13L14L15L16L17L21L22L23L24L25L26L27L28L29L30L31L32L33L34L35L37L38L39L40L41L42L43L44

METHOD AND APPARATUS FOR BIT-LEVEL PDSCH MUTING AND/OR RECEIVER PUNCTURING IN LTE-ADVANCED HETEROGENEOUS NETWORKS

BACKGROUND OF THE INVENTION

The present invention relates generally to communications systems and, more particularly, to method and apparatus for bit-level PDSCH (Physical Downlink Shared Channel) muting and/or receiver puncturing in LTE-A (Long Term Evolution-Advanced) heterogeneous networks.

The next-generation cellular system, i.e., the LTE-A network, is being designed to improve the spectral efficiency per unit area by reducing the cell size via heterogeneous deployment of a diverse set of base stations (BSs). In a heterogeneous cellular network, the macro BSs are deployed in regular and planned manner with high transmit power (the typical value is 46 dBm) and the overlaid pico BSs are deployed in the poor coverage area (e.g., the edge of a macro cell) with relatively low transmit power (the typical value is 30 dBm). Such an overlaid BS deployment can improve the coverage and provide capacity gain by increasing spatial reuse of the spectrum.

Consider the downlink of a LTE-A heterogeneous network. The pico user terminals or UEs (i.e., the UEs that are associated to pico cells) suffer strong interference from its neighboring macro BSs due to the high transmit power of the macro BSs. In order to improve the throughput performance of the pico UEs, especially those on the cell edge, intelligent inter cell interference coordination (ICIC) is needed to deal with the interference between macro BSs and pico UEs. In LTE-A Rel-10 ICIC, the macro BSs can mute certain subframes, which are called almost blank subframes (ABSs), in order reduce the interference to the pico UEs. In an ABS, most resource elements (REs) are blank and only a small amount of REs carry some system information (e.g., the cell-specific reference signals (RSs) and synchronization signals). As such, the pico UEs can achieve higher data rate when the macro BSs transmit ABSs due to the reduced interference level.

BRIEF SUMMARY OF THE INVENTION

Embodiments of the invention provide a new transmission and a new reception scheme for the pico UEs to eliminate the interference from their neighboring macro BSs in a macro-pico deployment, wherein the pico UEs, especially those in the cell edge, suffer strong interference from their neighboring macro BSs. As such, the cell average and cell edge throughput can be significantly improved by the proposed schemes. In a specific embodiment, methods are proposed for a pico BS and its associated UEs to deal with the interference caused by the cell-specific reference signal (CRS) from the macro BSs in a LTE-A heterogeneous network. In one proposed method, the pico BS chooses a bit-level PDSCH muting pattern, for each of its associated UEs, wherein the PDSCH REs which suffer from the CRS interference arising from other BSs utilize fewer available bits to carry information bits and the rest of the bits are set as dummy. The PDSCH muting pattern is based on the interference information contained in the RRM (Radio Resource Management) reports sent by pico UEs. The pico BS communicates this PDSCH muting pattern to the associated UEs which discard the corresponding dummy bits. In another proposed method, the UE performs RRM measurement and uses the interference information to decide a bit-level PDSCH puncturing pattern for PDSCH REs suffering from CRS interference arising from other BSs wherein only certain bits extracted from victim PDSCH REs are utilized for decoding and the rest are discarded. The PDSCH puncturing module updates the PDSCH puncturing pattern in the memory. The punctured bits are removed from the bit sequence according to the active PDSCH puncturing pattern in the PDSCH puncturing pattern stored in the memory. The proposed methods can reduce the interference from macro BSs to pico UEs to a maximum extent and thus significantly improve the overall system performance.

In accordance with an aspect of the present invention, a base station (BS) to transfer data to a user equipment comprises: an interface to receive radio resource management (RRM) measurement from the user equipment on received reference signal (RS) strength for each base station of one or more other base stations in a surrounding area of the user equipment, and an X2 interface to receive transmission information of almost blank subframes and corresponding cell-specific reference signal (CRS) resource element (RE) locations from the one or more other base stations; and a controller to manage bit-level PDSCH (Physical Downlink Shared Channel) muting information, which includes identifying PDSCH resource elements (REs) suffering the most from CRS interference arising from other BSs that are to be subjected to bit-level muting and allocating to the identified REs a number of bits less than the number of bits allocated to normal REs which are same as an underlying modulation order, based on the received almost blank subframes and the corresponding CRS RE locations and interference information received via RRM measurement reports, and to transfer data with two levels of bit allocations to various PDSCH REs to the user equipment. The two levels of bit allocations are full allocation of bits equal in number to the underlying modulation order (normal) and partial allocation of bits less in number to the underlying modulation order (bit-level muting).

In some embodiments, the controller is configured to identify the REs to be subjected to bit-level muting by identifying the REs that suffer strong CRS interference from the one or more other base stations, based on the received almost blank subframes and corresponding CRS RE locations and the interference information received via RRM measurement reports. The interface is configured to transfer the bit-level PDSCH muting information to the user equipment. The controller is configured to allocate to the identified REs a number of bits less than the number of bits allocated to normal REs according to a K-bit bitmap for each identified RE. The controller is configured to decide the K-bit bitmap identifying one or more bit positions to be muted in each identified RE, the number of bits allocated to an identified RE being less than the number of bits allocated to a normal RE by a difference equal to the number of bit positions to be muted for the identified RE.

In specific embodiments, the controller is configured to assign dummy bits to the muted bit positions of each identified RE before transferring the data with the bit-level muting of the identified REs to the user equipment. The controller is configured, before assigning dummy bits to the muted bit positions, to perform encoding and rate matching on a bit sequence containing the bits in the REs. The controller is configured, after assigning the dummy bits to the muted bit positions and before transferring the data with the bit-level muting of the identified REs to the user equipment, to perform modulation and PDSCH resource mapping on the bit sequence so that each PDSCH RE accommodates one modulated symbol.

In accordance with another aspect of the invention, a user equipment to receive data from a base station comprises: a radio resource management (RRM) module to perform RRM measurement on received reference signal (RS) strength for each base station of one or more other base stations in a surrounding area of the user equipment; and an interface to receive data with bit-level PDSCH (Physical Downlink Shared Channel) muting from the base station which, based on almost blank subframes having a plurality of resource elements (RE) and cell-specific reference signal (CRS) resource element (RE) locations from the one or more other base stations and the RRM measurement from the user equipment, identifies the REs to be subjected to bit-level muting and allocates to the identified REs a number of bits less than the number of bits allocated to normal REs which are not to be muted, and transfer the data with the bit-level muting of the identified REs to the user equipment via the interface.

In some embodiments, the identified REs to be subjected to bit-level muting are REs that suffer strong CRS interference from the one or more other base stations, based on the received almost blank subframes and CRS RE locations and the RRM measurement. The interface is configured to receive, from the base station, bit-level PDSCH muting information which includes the identified REs to be subjected to bit-level muting and allocation to the identified REs a number of bits less than the number of bits allocated to normal REs which are not to be muted. The bit-level PDSCH muting information includes a K-bit bitmap for each identified RE used to allocate to the identified REs a number of bits less than the number of bits allocated to normal REs. The K-bit bitmap identifies one or more bit positions to be muted in each identified RE, the number of bits allocated to an identified RE being less than the number of bits allocated to a normal RE by a difference equal to the number of bit positions to be muted for the identified RE.

In specific embodiments, the dummy bits are added to the muted bit positions of each identified RE in the data with the bit-level muting of the identified REs received by the user equipment via the interface from the base station. The user equipment comprises a baseband processor to remove the dummy bits based on the bit-level PDSCH muting information received from the base station. The data received includes PDSCH REs, each PDSCH RE accommodating one modulated symbol. The baseband processor is configured, before removing the dummy bits, to demap the received PDSCH REs to a modulated symbol stream and to demodulate the modulated symbol stream to a bit sequence. The baseband processor is configured, after removing the dummy bits from the bit sequence, to perform rate dematching and decoding on the bit sequence.

In accordance with another aspect of this invention, a user equipment to receive data from a base station comprises: a radio resource management (RRM) module to perform RRM measurement on received reference signal (RS) strength for each base station of one or more other base stations in a surrounding area of the user equipment; an interface to receive data from the base station, and to receive almost blank subframes having a plurality of resource elements (REs) and cell-specific reference signal (CRS) resource elements from the one or more other base stations; and a bit-level PDSCH (Physical Downlink Shared Channel) puncturing module to identify the PDSCH REs in the received data to be subjected to bit-level puncturing wherein Log-Likelihood ratios (LLRs) corresponding to some bits in the identified PDSCH REs are punctured or discarded, based on the received almost blank subframes and corresponding CRS RE locations and interference information obtained during the RRM measurements.

In some embodiments, the identified REs to be subjected to bit-level puncturing are PDSCH REs that suffer strong CRS interference from the one or more other base stations, based on the received almost blank subframes and CRS RE locations and the RRM measurement. The bit-level PDSCH puncturing module manages bit-level PDSCH puncturing information which includes a K-bit bitmap for each identified RE used to allocate to the identified REs a number of bits less than the number of bits allocated to normal REs. The K-bit bitmap identifies one or more bit positions to be punctured in each identified RE, the number of bits allocated to an identified RE being less than the number of bits allocated to a normal RE by a difference equal to the number of bit positions to be punctured for the identified RE. The user equipment further comprises a baseband processor to remove punctured bits at the punctured bit positions of each identified RE in the data received from the base station. The data received includes PDSCH REs, each PDSCH RE accommodating one modulated symbol. The baseband processor is configured, before removing the punctured bits, to demap the received PDSCH REs to a modulated symbol stream and to demodulate the modulated symbol stream to a bit sequence. The baseband processor is configured, after removing the punctured bits from the bit sequence, to perform rate dematching and decoding on the bit sequence.

In one embodiment, the identified REs all have a same number of bits to be punctured, and the baseband processor is configured to remove the same number of punctured bits from the identified REs. In another embodiment, the identified REs have different numbers of bits to be punctured, and the baseband processor is configured to remove different numbers of punctured bits from the identified REs.

These and other features and advantages of the present invention will become apparent to those of ordinary skill in the art in view of the following detailed description of the specific embodiments.

BRIEF DESCRIPTION OF THE DRAWINGS

FIG. 9 shows an example of a PDSCH muting table.

FIG. 10 is an example of a flow diagram illustrating the TX baseband processing in the proposed scheme under the first approach according to an embodiment of the present invention.

FIG. 11 shows an example of adding dummy bits in the proposed scheme under the first approach.

DETAILED DESCRIPTION OF THE INVENTION

Figure 1:
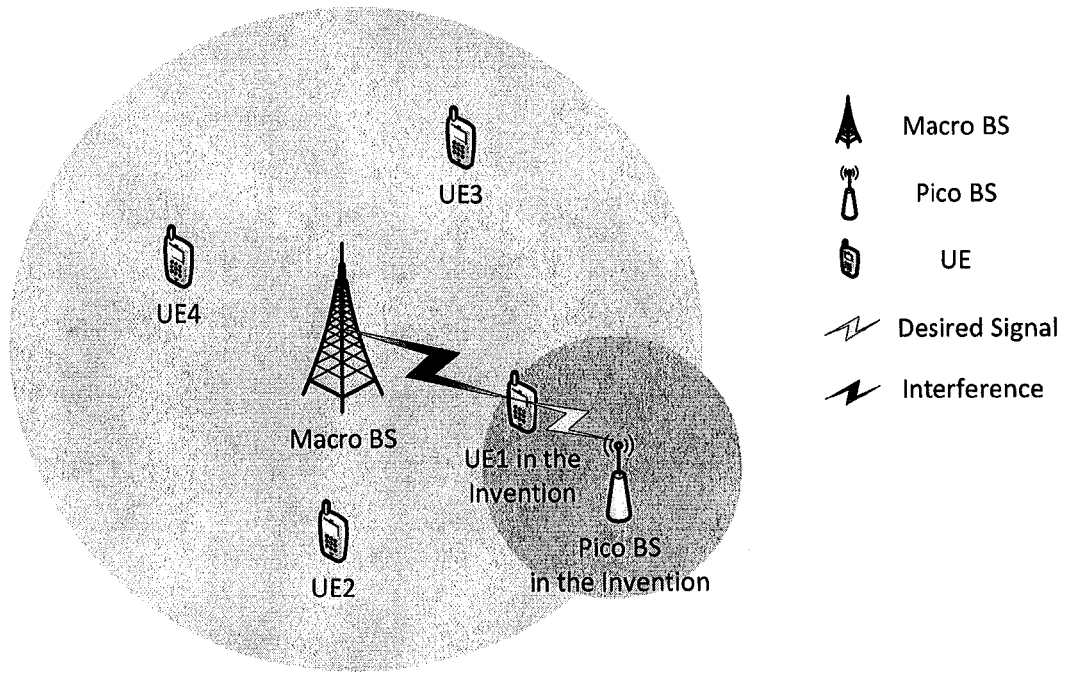
FIG. 1 shows an example of a heterogeneous network including a macro base station, a pico base station, and a plurality of user terminals.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment", "this embodiment", or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

In the following description, relative orientation and placement terminology, such as the terms horizontal, vertical, left, right, top and bottom, is used. It will be appreciated that these terms refer to relative directions and placement in a two dimensional layout with respect to a given orientation of the layout. For a different orientation of the layout, different relative orientation and placement terms may be used to describe the same objects or operations.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing", "computing", "calculating", "determining", "displaying", or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for bit-level PDSCH muting and/or receiver puncturing in a LTE-A heterogeneous network.

In LTE-A Rel-10 ICIC, the macro BSs can mute certain subframes, which are called almost blank subframes (ABSs), in order reduce the interference to the pico UEs. In an ABS, most resource elements (REs) are blank and only a small amount of REs carry some system information (e.g., the cell-specific RSs and synchronization signals). Ideally speaking, the ABSs should be totally blank when configured by a macro BS in order to eliminate the interference to pico UEs as much as possible. However, in Rel-10, the cell-specific reference signals (CRSs) must be transmitted in some specific resource elements (REs) of an ABS subframe for legacy UEs considering backward compatibility. In addition, CRS REs are usually transmitted at a higher power compared to normal PDSCH REs. In such a scenario, the interference from the macro BS in an ABS subframe cannot be ignored and advanced techniques are needed to deal with the remaining CRS interference.

Consider the downlink of a heterogeneous cellular network. This disclosure proposes a scheme for the pico UEs to deal with the CRS interference in the ABS subframes, which requires joint signal processing at the transmitter (i.e., the pico BS) and at the receiver (i.e., the pico UE).

FIG. 1 shows an example of a heterogeneous network including a macro base station, a pico base station, and a plurality of user terminals. In FIG. 1, the heterogeneous cellular network has both macro BS and pico BS coexisting to serve the UEs in an area. UE1, which is associated to the pico BS but on the cell edge, may fail to receive packets from the pico BS even when the macro BS is configured to transmit an ABS subframe, since the CRS interference from the macro BS reduces the signal-to-interference-plus-noise (SINR) of the desired signal in an ABS subframe. A proposed scheme according to an embodiment of the invention can be implemented in the pico BS and UE1 to reduce the CRS interference in an ABS subframe.

Figure 2:
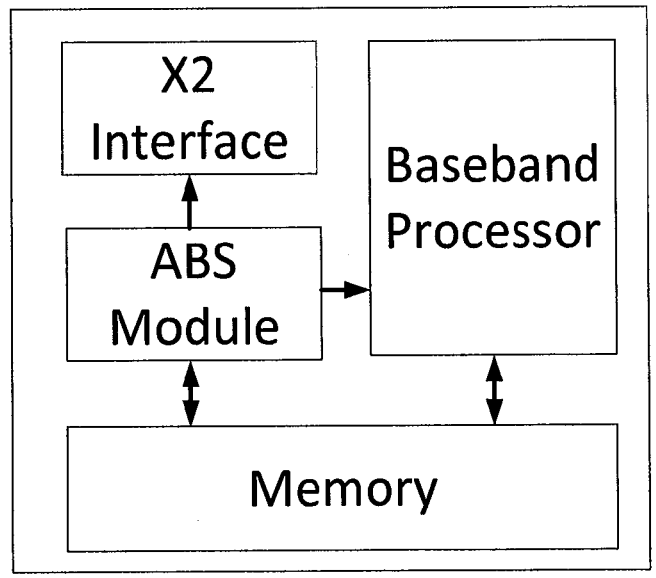
FIG. 2 is a block diagram illustrating an example of a macro base station.

FIG. 2 is a block diagram illustrating an example of a macro base station (e.g., macro BS as shown in FIG. 1). The macro BS has the following four modules: (i) the X2 interface, through which the macro BS exchanges information (e.g., the CRS RE location and the ABS pattern) with other macro and pico BSs; (ii) the ABS module, where the ABS pattern is determined; (iii) the baseband processor, which performs the baseband processing; and (iv) the memory, where the ABS pattern is stored.

Figure 3:
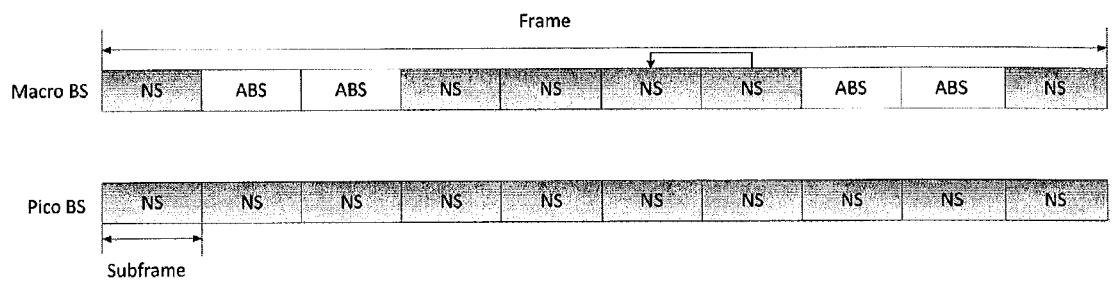
FIG. 3 shows an example of a Long Term Evolution-Advanced frame with almost blank subframe configuration for the macro base station.

FIG. 3 shows an example of a Long Term Evolution-Advanced (LTE-A) frame with almost blank subframe (ABS) configuration for the macro base station. In the LTE-A frame (which has 10 subframes indexing from 0 to 9) with ABS configuration for the macro BS, subframes 1, 2, 7, and 8 (denoted as the gray subframes) are configured as ABS and the rest of the subframes are configured as normal subframes (NSs). The macro BS informs the ABS pattern to the pico BS. Based on the received ABS pattern, the pico BS can schedule its cell-edge UEs (e.g., UE1 as shown in FIG. 1) in ABS subframes to improve their data rate.

Figure 4:
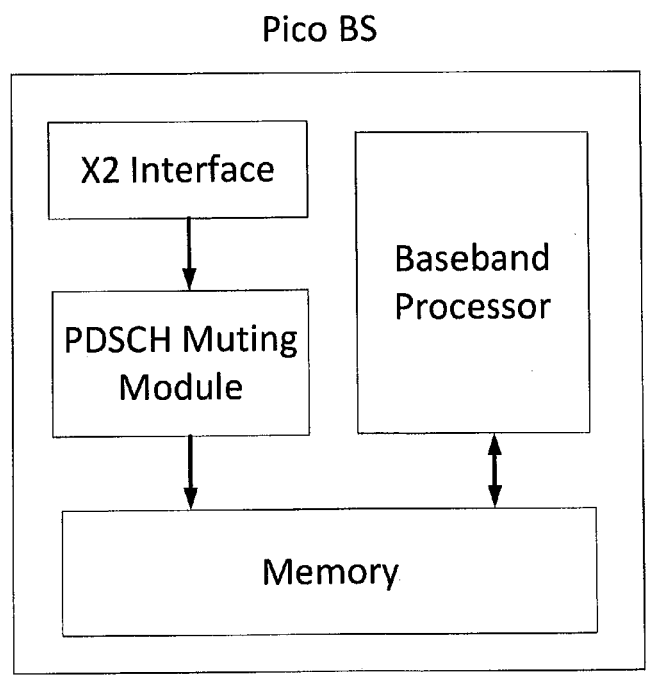
FIG. 4 is a block diagram illustrating an example of a pico base station.

FIG. 4 is a block diagram illustrating an example of a pico base station. In FIG. 4, the pico BS (e.g., the pico BS as shown in FIG. 1) includes the X2 interface, through which the pico BS obtains the ABS pattern and the CRS RE (cell-specific reference signal resource element) location from its neighboring macro BSs. and the following three components: (i) the PDSCH muting module, which determines the bit-level PDSCH muting pattern (as will be shown later in FIG. 8) and updates the PDSCH muting table (as will be defined in the table shown in FIG. 9) in the memory; (ii) the baseband processor, which performs the TX (transmit) processing as will be shown later in FIGS. 10 and 11; and (iii) the memory, where the PDSCH muting table is stored.

Figure 5:
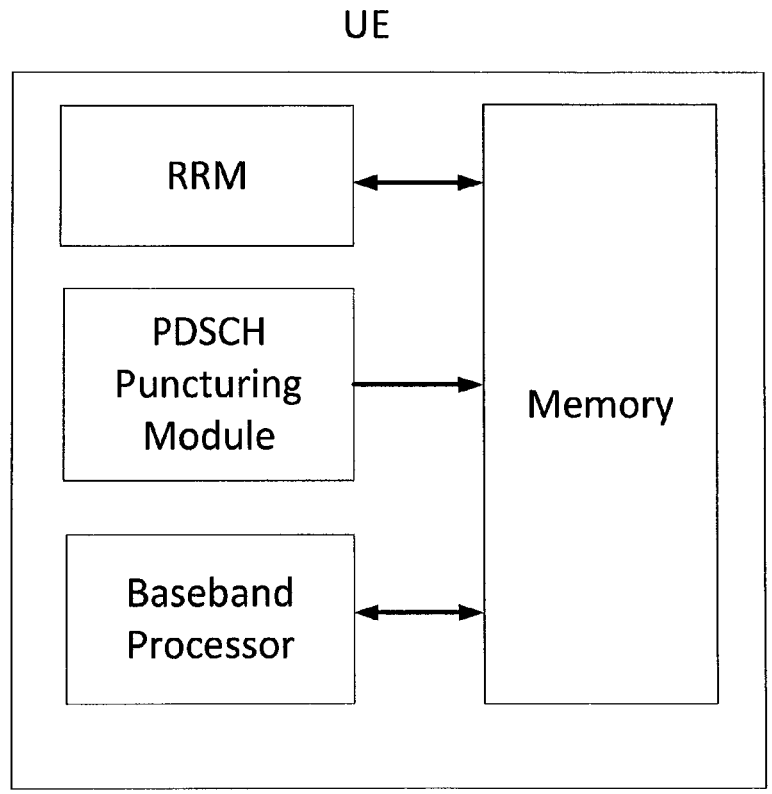
FIG. 5 is a block diagram illustrating an example of a user terminal.

FIG. 5 is a block diagram illustrating an example of a user terminal. In FIG. 5, the UE includes a controller having the following four components: (i) the RRM (Radio Resource Management) module, where the RRM measurement is performed and reported to the pico BS; (ii) the PDSCH puncturing module, which receives the bit-level PDSCH muting pattern from its associated pico BS and updates the PDSCH muting table in the memory; (iii) the baseband processor, which performs the RX (receive) processing as will be shown in FIGS. 13 and 14; and (iv) the memory, where the PDSCH muting table is stored.

First Approach

Figure 6:
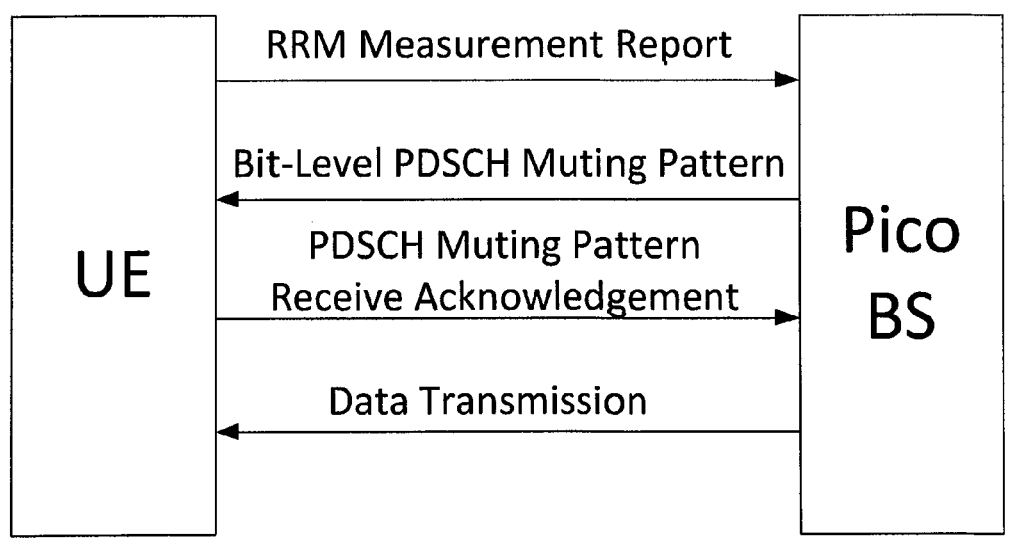
FIG. 6 shows an example of signaling between the pico base station and the user terminal in a first approach according to one embodiment of the present invention.

FIG. 6 shows an example of signaling between the pico base station and the user terminal in a first approach according to one embodiment of the present invention. In the first approach shown in FIG. 6, the signaling exchange is between the transmitter or TX (i.e., the pico BS) and the receiver or RX (i.e., the UE, more specifically, UE1) in the network of FIG. 1. At the beginning of the data transmission, the UE performs the RRM measurement as defined, e.g., in 3GPP TS36.331 v.10.4.0 Available online: http://www.3gpp.orcilftp/Specs/html-info/36331.htm (Ref. 1), and sends the measurement report to the pico BS, which contains the received RS (reference signal) strength for each macro BS in its surrounding area. Based on the RRM measurement report and the information of the CRS RE (cell-specific reference signal resource element) location from the macro BSs, the pico BS identifies the bit-level PDSCH muting pattern which consists of i) the PDSCH REs (resource elements) which are more severely impacted by the CRS interference than the rest of the PDSCH REs, and ii) the number of bits in identified PDSCH REs which are unlikely to be corrupted by the CRS interference. Afterwards, the pico BS sends the bit-level PDSCH muting pattern to the UE for the RX processing. After the pico BS receives the acknowledgement from the UE, it starts the data transmission by performing the proposed TX processing. At the UE receiver, the proposed RX processing is performed accordingly for data reception.

Figure 7:
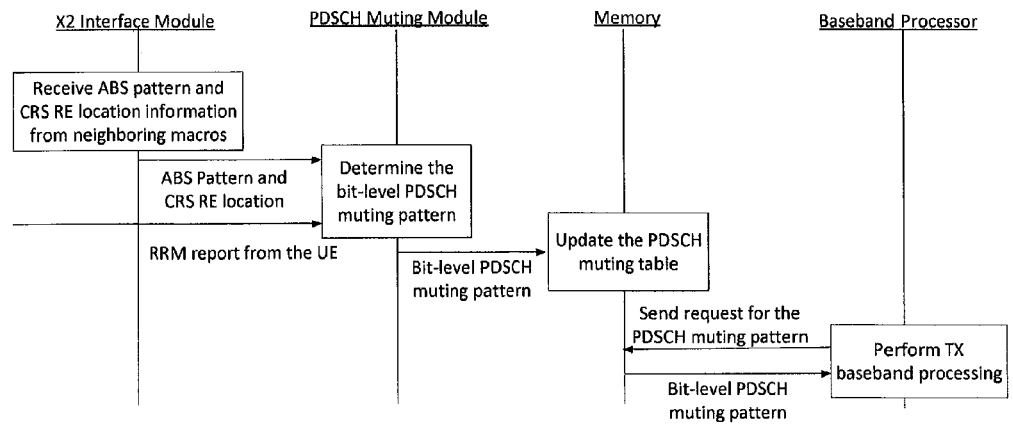
FIG. 7 is an example of a flow diagram illustrating the operation in the pico base station of FIG. 6.

FIG. 7 is an example of a flow diagram illustrating the operation in the pico base station of FIG. 6. The X2 interface module of the pico BS receives the ABS pattern and the information of the CRS RE location from its neighboring macro BSs and inputs such information to the PDSCH muting module (e.g., how much interference there is, which BS signals are received and how strong these signals are). Based on the input of the X2 interface module and the RRM report from the UE, the PDSCH muting module determines the bit-level PDSCH muting pattern and updates the PDSCH muting table in the memory. The PDSCH muting table in the memory will be used by the baseband processor for TX processing. As seen in FIG. 7, the baseband processor sends a request for the PDSCH muting pattern and receives the bit-level PDSCH muting pattern from the memory.

Figure 8:
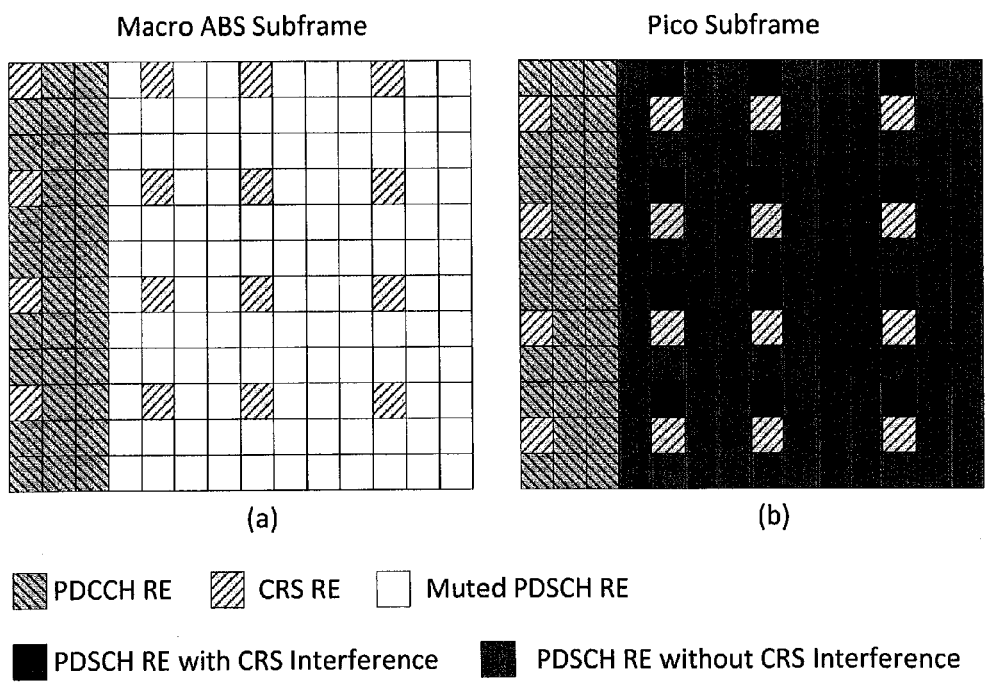
FIG. 8 shows an example of PDSCH muting pattern for (a) the macro almost blank subframe and (b) the pico subframe.

FIG. 8 shows an example of PDSCH muting pattern for (a) the macro almost blank subframe and (b) the pico subframe. This is used as an example to show how to determine the bit-level PDSCH muting pattern and update the PDSCH muting table for the pico BS. Consider the example as given in FIG. 1. We assume that an ABS subframe is divided into multiple physical resource blocks (PRBs) in the frequency domain and that the CRS REs of the macro BS in a PRB are located as given in FIG. 8a. Note that all PRBs have the same locations of the CRS REs. FIG. 8a also shows PDCCH (Physical Downlink Control Channel) REs and Muted PDSCH REs. After receiving the ABS pattern from the macro BS (as shown in FIG. 3), the location of the CRS REs from the macro BS (as shown in FIG. 8a), and the RRM report from the UE (which indicates the macro BS has strong interference to the pico UE), the pico BS identifies the REs that suffer strong CRS interference from the macro BS, i.e., the REs with cross-hatching shown as "PDSCH RE with CRS interference" in FIG. 8b. The REs that do not suffer strong CRS interference are shown as "PDSCH RE without CRS interference" in FIG. 8b. Afterwards, the PDSCH muting module updates the PDSCH muting table in the memory based on the strong CRS interference identified in FIG. 8b.

FIG. 9 shows an example of a PDSCH muting table. The PDSCH muting table has columns of RE Muting Pattern Index, Muted REs, bitmap, and status. The "Muted REs" column is predefined and fixed. The PDSCH muting module chooses the RE muting patterns whose bit-level "muted REs" column covers the largest number of the identified REs with strong CRS interference and sets its status to be "Active." Note that other RE muting patterns will be automatically set to be "idle" after one RE muting pattern is picked to be "Active." Assume that each PDSCH RE carries K information bits. The pico BS then decides the bit-level muting position in each RE with strong CRS interference, which can be represented by a K-bit bitmap with "1" indicating muting, i.e., the particular bit being set as a dummy bit. For example, 0011 means that for K=4, the last 2 bits are set as dummy bits in a muted RE. Meanwhile, the pico BS informs the UE of the bit-level PDSCH muting pattern, i.e., the PDSCH muting pattern index and the corresponding bitmap, for data reception.

The PDSCH muting module is actually PDSCH bit-level muting module that performs bit-level muting of bits instead of RE-level muting of the entire RE where no data transmission occurs in that particular RE. Another way to characterize its function is that it allows a "muted RE" to carry a number of bits less than the number of bits allocated to normal REs that are not affected or substantially not affected by CRS interference. The PDSCH bit-level muting module may also be referred to as RE bit allocation module.

FIG. 10 is an example of a flow diagram illustrating the TX baseband processing in the proposed scheme under the first approach according to an embodiment of the present invention. The information bits (e.g., L bits) of a transport block first pass through the turbo encoder (e.g., 3L+12 bits) that is specified, e.g., in 3GPP TS36.212 v.10.4.0 Available online: http://www.3gpp.org/ftp/Specs/html-info/36212.11m (Ref. 2). The baseband processor then performs rate matching (E bits being less than 3L+12 bits) and adds dummy bits to the encoded bits according to active PDSCH muting pattern in the PDSCH muting table in the memory. Finally, the bit sequence is modulated and mapped to the PDSCH REs. The details of each operation are explained as follows.

Turbo Encoding: This operation is specified in Ref. 2.

Rate Matching: The circular buffer rate matching (CBRM) defined, e.g., in Ref. 2, is used and configured such that the number of bits after rate matching is NK-MD, where N is the number of PDSCH REs assigned to the UE, M is the number of bit-level Muted REs, K is the modulation order (i.e., the number of bits carried in each PDSCH RE), and D is the number of "1"s in the bitmap of the active PDSCH muting pattern. The number of bits allocated to normal REs is the same as the underlying modulation order.

Adding Dummy Bits: D dummy bits are added to each PDSCH RE with CRS interference.

Modulation: The modulation is specified, e.g., in Ref. 2 where K takes value from 2(QPSK), 4(16QAM), and 6(64QAM).

PDSCH Resource Mapping: The modulated symbols are mapped to PDSCH REs such that each PDSCH RE accommodates one modulated symbol.

FIG. 11 shows an example of adding dummy bits in the proposed scheme under the first approach. This relates to TX processing. Assume that one resource block is assigned to a UE, where twelve REs in the PDSCH region suffer strong CRS interference as shown in FIG. 11. Additionally, assume 16QAM is used for modulation and 2 dummy bits are added for each RE with CRS interference. In this case, we have N=120, M=12, K=4, and D=2. The total number of bits after rate matching is NK-MD=456. We assume that the bit sequence after rate matching is 001111011101101011001110111011111000011 . . . as shown in FIG. 11. After adding dummy bits, the sequence becomes 0011 1100 0111 0110 1000 1110 0111 0111 0100 1111 0001 . . . based on the assumption that the modulated symbols are mapped to PDSCH REs first along the horizontal line and then along the vertical line.

Figure 12:
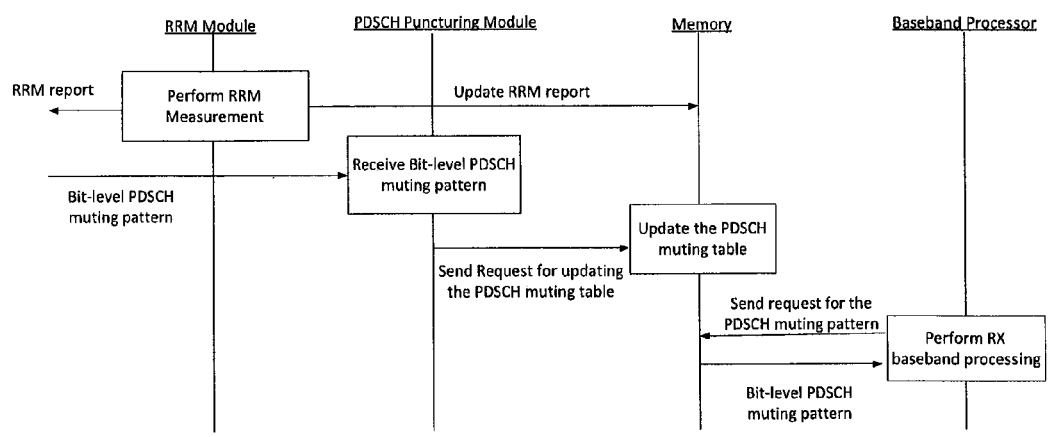
FIG. 12 is an example of a flow diagram illustrating the operation in the user terminal of FIG. 6 under the first approach.

FIG. 12 is an example of a flow diagram illustrating the operation in the user terminal of FIG. 6 under the first approach. UE uses the RRM module to perform RRM measurement and reports to the pico BS. After receiving the bit-level PDSCH muting pattern, the PDSCH puncturing module updates the PDSCH muting table in the memory by setting the corresponding PDSCH muting pattern to be active and updating the bitmap. Note that the PDSCH muting table for the UE has the same format as that for the pico BS and the columns of "PDSCH muting pattern index" and bit-level "Muted REs" are also the same. The PDSCH muting table in the memory will be used by the baseband processor for RX processing.

Figure 13:
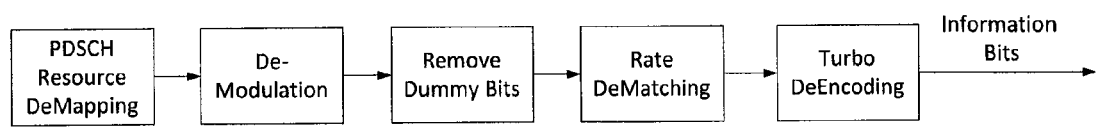
FIG. 13 is an example of a flow diagram illustrating the RX processing in the proposed scheme under the first approach.

FIG. 13 is an example of a flow diagram illustrating the RX processing in the UE in the proposed scheme under the first approach. More specifically, the RX baseband processing for a UE in the proposed scheme is the reverse operation of the TX processing. The received PDSCH REs are demapped to a modulated symbol stream, which is then demodulated to a bit sequence. The dummy bits are removed from the bit sequence according to the active PDSCH muting pattern in the PDSCH muting table stored in the memory. Finally, rate dematching and turbo decoding are performed. Note that the output of the demodulation is the logarithm of the likelihood ratio or Log-Likelihood ratio (LLR) of each bit. By removing dummy bits, we mean discarding the LLRs of the dummy bits.

Figure 14:
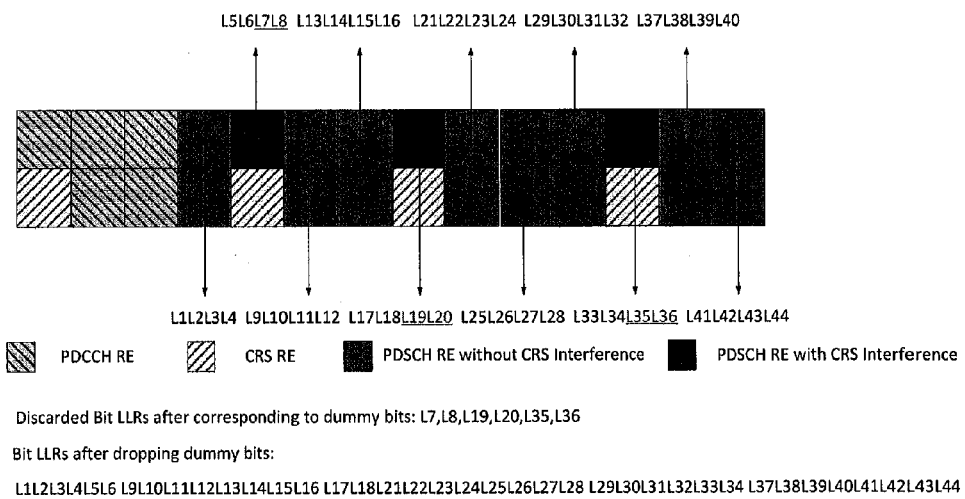
FIG. 14 shows an example of the RX processing in the proposed scheme under the first approach.

FIG. 14 shows an example of the RX processing in the proposed scheme under the first approach. Assume that the TX processing as shown in FIG. 10 is performed at the pico BS. Let Lk denote the LLR of the k-th bit. The LLRs corresponding to discarded dummy bits are L7, L8, L19, L20, L35, and L36. It may be noted that the first approach always has the same number of dummy bits in PDSCH REs with CRS interference. The LLR sequence after dropping dummy bits is L1, L2, L3, L4, L5, L6, L9, L10, L11, L12, L13, L14, L15, L16, L17, L18, L21, L22, L23, L24, L25, L26, L27, L28, L29, L30, L31, L32, L33, L34, L37, L38, L39, L40, L41, L42, L43, L44, and so on.

Second Approach

Figure 15:
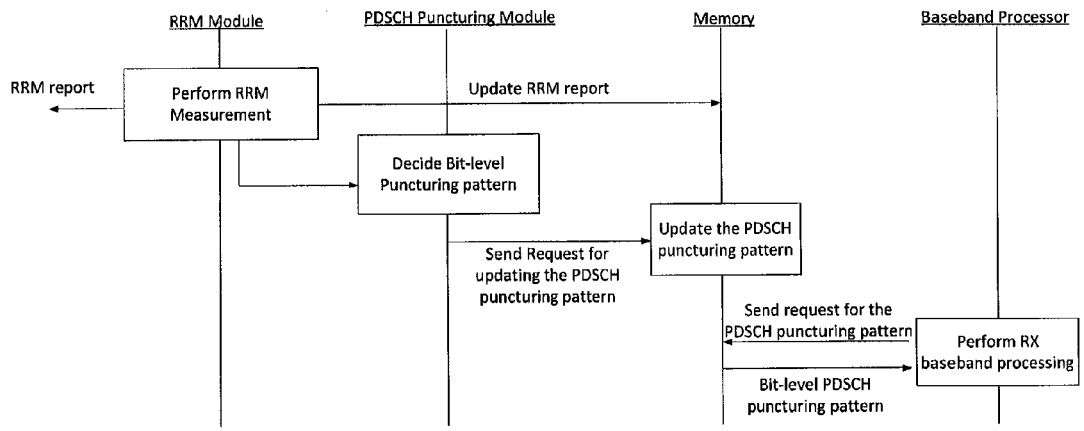
FIG. 15 is an example of a flow diagram illustrating the operation in the user terminal of FIG. 5 under the second approach.

The second approach needs to be implemented at the UE end only. This approach assumes no PDSCH muting at pico BS (as in existing LTE standards). FIG. 15 is an example of a flow diagram illustrating the operation in the user terminal of FIG. 5 under the second approach. The UE uses the RRM module to perform RRM measurement and uses the interference information to decide a bit-level PDSCH puncturing pattern for PDSCH REs suffering from CRS interference arising from other BSs. The PDSCH puncturing module updates the PDSCH puncturing pattern in the memory. The PDSCH puncturing pattern in the memory will be used by baseband processor for RX processing.

Figure 16:
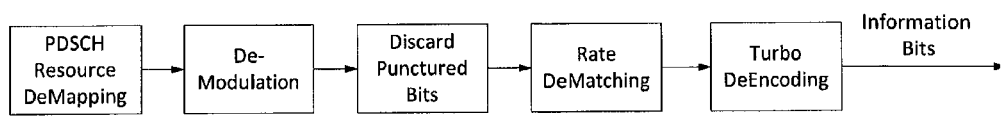
FIG. 16 is an example of a flow diagram illustrating the RX baseband processing in the UE in the proposed scheme under the second approach.

FIG. 16 is an example of a flow diagram illustrating the RX baseband processing in the UE in the proposed scheme under the second approach. The received PDSCH REs are demapped to a modulated symbol stream, which is then demodulated to a bit sequence. The punctured bits are removed from the bit sequence according to the active PDSCH puncturing pattern in the PDSCH puncturing pattern stored in the memory. Finally, rate dematching and turbo decoding are performed. Note that the output of the demodulation is the logarithm of the likelihood ratio (LLR) of each bit. By removing punctured bits, we mean discarding the LLRs of the punctured bits.

Figure 17:
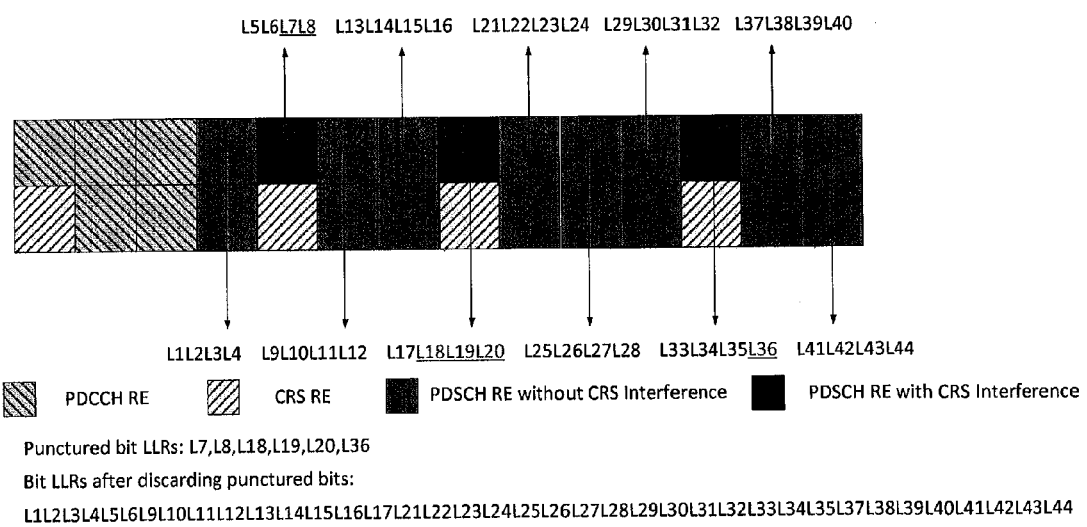
FIG. 17 shows an example of the RX processing in the proposed scheme under the second approach.

FIG. 17 shows an example of the RX processing in the proposed scheme under the second approach. Let Lk denote the LLR of the k-th bit. Different from the first approach, which discards "equal" number of bit LLRs in PDSCH REs with CRS interference, the second approach uses a PDSCH puncturing pattern which can discard equal or unequal number of bit LLRs from various PDSCH REs with CRS interference. In the example shown in FIG. 17, 2 bit LLRs are discarded from PDSCH RE located at (1,5) position, 3 bit LLRs are discarded from PDSCH RE located at (1,8) position, and 1 bit LLR is discarded from PDSCH RE located at (1,12) position. The LLRs for punctured bits are L7, L8, L18, L19, L20, and L36. The LLR sequence fed to the Turbo decoder is: L1, L2, L3, L4, L5, L6, L9, L10, L11, L12, L13, L14, L15, L16, L17, L21, L22, L23, L24, L25, L26, L27, L28, L29, L30, L31, L32, L33, L34, L35, L37, L38, L39, L40, L41, L42, L43, L44 and so on.

The above describes two approaches to reduce the CRS interference in an ABS subframe from macro BSs to pico UEs. These approaches can be used to develop a LTE-A heterogeneous network to balance the achievable throughput between macro and pico UEs and also improve the overall system performance.

The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for bit-level PDSCH muting and/or receiver puncturing in a LTE-A heterogeneous network. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A base station to transfer data to a user equipment, the base station comprising:
   an interface to receive radio resource management (RRM) measurement from the user equipment on received reference signal (RS) strength for each base station of one or more other base stations in a surrounding area of the user equipment;
   an X2 interface to receive transmission information of almost blank subframes and corresponding cell-specific reference signal (CRS) resource element (RE) locations from the one or more other base stations; and
   a controller to manage bit-level PDSCH (Physical Downlink Shared Channel) muting information, which includes identifying PDSCH resource elements (REs) that each include one or more first bits suffering from CRS interference arising from one or more other base stations and that are to be subjected to bit-level muting, and allocating one or more second bits of each of the identified REs, which do not suffer from the CRS interference, to the identified REs, and not allocating the one or more first bits to the identified REs, based on the received almost blank subframes and the corresponding CRS RE locations and interference information received via RRM measurement reports, and to transfer data with two levels of bit allocations to various PDSCH REs to the user equipment.

2. The base station of claim 1, wherein the controller is configured to identify the REs to be subjected to bit-level muting by identifying the REs that suffer strong CRS interference from the one or more other base stations, based on the received almost blank subframes and corresponding CRS RE locations and the interference information received via RRM measurement reports.

3. The base station of claim 1, wherein the interface is configured to transfer the bit-level PDSCH muting information to the user equipment.

4. The base station of claim 1, wherein the controller is configured to allocate to the identified REs a number of bits less than the number of bits allocated to normal REs according to a K-bit bitmap for each identified RE; and wherein the controller is configured to decide the K-bit bitmap identifying one or more bit positions of the one or more first bits to be muted in each identified RE, the number of bits allocated to an identified RE being less than the number of bits allocated to a normal RE by a difference equal to the number of bit positions to be muted for the identified RE.

5. The base station of claim 4, wherein the controller is configured to assign dummy bits to the muted bit positions of each identified RE before transferring the data with the bit-level muting of the identified REs to the user equipment.

6. The base station of claim 5, wherein the controller is configured, before assigning dummy bits to the muted bit positions, to perform encoding and rate matching on a bit sequence containing the bits in the REs; and wherein the controller is configured, after assigning the dummy bits to the muted bit positions and before transferring the data with the bit-level muting of the identified REs to the user equipment, to perform modulation and PDSCH resource mapping on the bit sequence so that each PDSCH RE accommodates one modulated symbol.

7. A user equipment to receive data from a base station, the user equipment comprising:
   a radio resource management (RRM) module to perform RRM measurement on received reference signal (RS) strength for each base station of one or more other base stations in a surrounding area of the user equipment; and
   an interface to receive data with bit-level PDSCH (Physical Downlink Shared Channel) muting from the base station which, based on almost blank subframes having a plurality of resource elements (RE) and cell-specific reference signal (CRS) resource element (RE) locations from the one or more other base stations and the RRM measurement from the user equipment, identifies the REs that each include one or more first bits suffering from CRS interference arising from one or more other base stations and that are to be subjected to bit-level muting and allocates one or more second bits of each of the identified REs, which do not suffer from the CRS interference, to the identified REs and does not allocate one or more first bits of each of the identified REs to the identified REs, and transfer the data with the bit-level muting of the identified REs to the user equipment via the interface.

8. The user equipment of claim 7, wherein the identified REs to be subjected to bit-level muting are REs that suffer strong CRS interference from the one or more other base stations, based on the received almost blank subframes and CRS RE locations and the RRM measurement.

9. The user equipment of claim 7, wherein the interface is configured to receive, from the base station, bit-level PDSCH muting information which includes the identified REs to be subjected to bit-level muting and allocation to the identified REs a number of bits less than the number of bits allocated to normal REs which are not to be muted.

10. The user equipment of claim 9, wherein the bit-level PDSCH muting information includes a K-bit bitmap for each identified RE used to allocate to the identified REs a number of bits less than the number of bits allocated to normal REs; and wherein the K-bit bitmap identifies one or more bit positions of the one or more first bits to be muted in each identified RE, the number of bits allocated to an identified RE being less than the number of bits allocated to a normal RE by a difference equal to the number of bit positions to be muted for the identified RE.

11. The user equipment of claim 9,
   wherein the dummy bits are added to the muted bit positions of each identified RE in the data with the bit-level muting of the identified REs received by the user equipment via the interface from the base station; and
   wherein the user equipment comprises a baseband processor to remove the dummy bits based on the bit-level PDSCH muting information received from the base station.

12. The user equipment of claim 11, wherein the data received includes PDSCH REs, each PDSCH RE accommodating one modulated symbol; wherein the baseband processor is configured, before removing the dummy bits, to demap the received PDSCH REs to a modulated symbol stream and to demodulate the modulated symbol stream to a bit sequence; and wherein the baseband processor is configured, after removing the dummy bits from the bit sequence, to perform rate dematching and decoding on the bit sequence.

13. A user equipment to receive data from a base station, the user equipment comprising:
   a radio resource management (RRM) module to perform RRM measurement on received reference signal (RS) strength for each base station of one or more other base stations in a surrounding area of the user equipment;
   an interface to receive data from the base station, and to receive almost blank subframes having a plurality of resource elements (REs) and cell-specific reference signal (CRS) resource elements from the one or more other base stations; and
   a bit-level PDSCH (Physical Downlink Shared Channel) puncturing module to identify the PDSCH REs in the received data that each include one or more first bits suffering from CRS interference arising from one or more other base stations and that are to be subjected to bit-level puncturing wherein Log-Likelihood ratios (LLRs) corresponding to the one or more first bits in each of the identified PDSCH REs are punctured or discarded, based on the received almost blank subframes and corresponding CRS RE locations and interference information obtained during the RRM measurements;
   wherein the identified REs each include one or more second bits which do not suffer from the CRS interference and are not punctured or discarded.

14. The user equipment of claim 13, wherein the identified REs to be subjected to bit-level puncturing are PDSCH REs that suffer strong CRS interference from the one or more other base stations, based on the received almost blank subframes and CRS RE locations and the RRM measurement.

15. The user equipment of claim 13, wherein the bit-level PDSCH puncturing module manages bit-level PDSCH puncturing information which includes a K-bit bitmap for each identified RE used to allocate to the identified REs a number of bits less than the number of bits allocated to normal REs; and wherein the K-bit bitmap identifies one or more bit positions of the one or more first bits to be punctured in each identified RE, the number of bits allocated to an identified RE being less than the number of bits allocated to a normal RE by a difference equal to the number of bit positions to be punctured for the identified RE.

16. The user equipment of claim 15, further comprising: a baseband processor to remove punctured bits at the punctured bit positions of each identified RE in the data received from the base station.

17. The user equipment of claim 16, wherein the data received includes PDSCH REs, each PDSCH RE accommodating one modulated symbol; wherein the baseband processor is configured, before removing the punctured bits, to demap the received PDSCH REs to a modulated symbol stream and to demodulate the modulated symbol stream to a bit sequence; and wherein the baseband processor is configured, after removing the punctured bits from the bit sequence, to perform rate dematching and decoding on the bit sequence.

18. The user equipment of claim 16, wherein the identified REs all have a same number of bits to be punctured; and wherein the baseband processor is configured to remove the same number of punctured bits from the identified REs.

19. The user equipment of claim 16, wherein the identified REs have different numbers of bits to be punctured; and wherein the baseband processor is configured to remove different numbers of punctured bits from the identified REs.

* * * * *